MINOR ARC SELECTING POSITIONAL SERVO SYSTEM

Filed March 30, 1961 3 Sheets-Sheet 1

INVENTORS.
MELVIN S. STILES
JORGEN L. NIELSEN
BY Daniel G. Sharp
ATTORNEY

Nov. 3, 1964 M. S. STILES ETAL 3,155,889

MINOR ARC SELECTING POSITIONAL SERVO SYSTEM

Filed March 30, 1961

3 Sheets-Sheet 2

Nov. 3, 1964 M. S. STILES ETAL 3,155,889

MINOR ARC SELECTING POSITIONAL SERVO SYSTEM

Filed March 30, 1961 3 Sheets-Sheet 3

United States Patent Office 3,155,889

Patented Nov. 3, 1964

3,155,889
MINOR ARC SELECTING POSITIONAL SERVO SYSTEM

Melvin S. Stiles, Rochester, and Jorgen L. Nielsen, Penfield, N.Y., assignors to General Dynamics Corporation, Rochester, N.Y., a corporation of Delaware Filed Mar. 30, 1961, Ser. No. 99,394
11 Claims. (Cl. 318—28)

This invention relates to a system for controlling the magnitude and direction of rotation of a rotating member or a turret. More particularly, the invention relates to a system for selectively rotating a member from a given angular position to a new position in such manner that the angular movement of the rotating member never exceeds 180°.

This invention is particularly suitable for digitally-tuned radio receivers and transmitters which use rotating turrets or switches in a technique whereby fixed tuned circuit elements are chosen in accordance with the desired operating frequency. This technique of digital selective tuning is described in a copending application of Roger R. Bettin, Alwin Hahnel, John E. R. Harrison, and Elmer W. Schwittek for United States Letters Patent, Serial No. 42,698, filed July 13, 1960, now Patent No. 3,054,057 entitled "Digitally Tuned Transmitter-Receiver." Digital tuning, as applied to the power amplifier stage of the system of the aforesaid copending application, is disclosed in a copending application of Edward R. Schickler for United States Letters Patent, Serial No. 53,829, filed September 2, 1960, now Patent No. 3,117,286 entitled "Turret-Type Tuner." The Schickler application discloses details of a typical turret tuner rotatable to a selected position by control means, the details of which do not form a part of Schickler's invention.

One of the requirements of the digital tuning technique described in the aforesaid copending applications is that the time taken for a change of equipment operating frequency must be relatively short. When a frequency change is dictated, that is, when the rotating member or turret carrying fixed tuned circuit elements is driven from a given angular position to a new position, it is desirable to drive the member to its new position in a direction involving the lesser angular rotation. For example, if the rotating member were at a position corresponding to 12 o'clock and rotation to a new position corresponding to 3 o'clock were desired, obviously it would take less time to drive the motor to the new position in a clockwise direction through an angle of 90° than in a counterclockwise direction through an angle of 270°. The control scheme of the invention, in addition to selectively positioning the rotating member, also is capable of rotating the member to its new position in the proper direction, regardless of what the old and new positions of the rotating member may be.

Summarizing, an object of this invention is to provide means for driving a rotating member to any selective one of a plurality of predetermined positions in accordance with the setting of a remote control device. Another object of the invention is to provide means for insuring that the maximum rotational travel required of the rotating member does not exceed one-half revolution.

One of the directional control systems of the prior art involves a split wiper switch having one conductor for each control position of each of the rotating members, each conductor being connected between a control box and the corresponding rotating member. For example, if two rotating members each having forty positions were used, eighty wires would be needed. In applications in which the control box and rotating member are several feet apart, the cable required for such a control scheme obviously is bulky and heavy. In fact the cable may be so heavy as to preclude its use in airborne applications. Another object of applicants' invention is to provide a control system for a rotating member which is relatively light and economical of circuit leads.

Another object of the invention is to provide a rotation control system wherein the current drain is relatively low.

The above-mentioned objects and other objects and features of the invention will become apparent by reference to the following description taken in conjunction with the accompanying drawings, wherein.

Figures 1, 2:
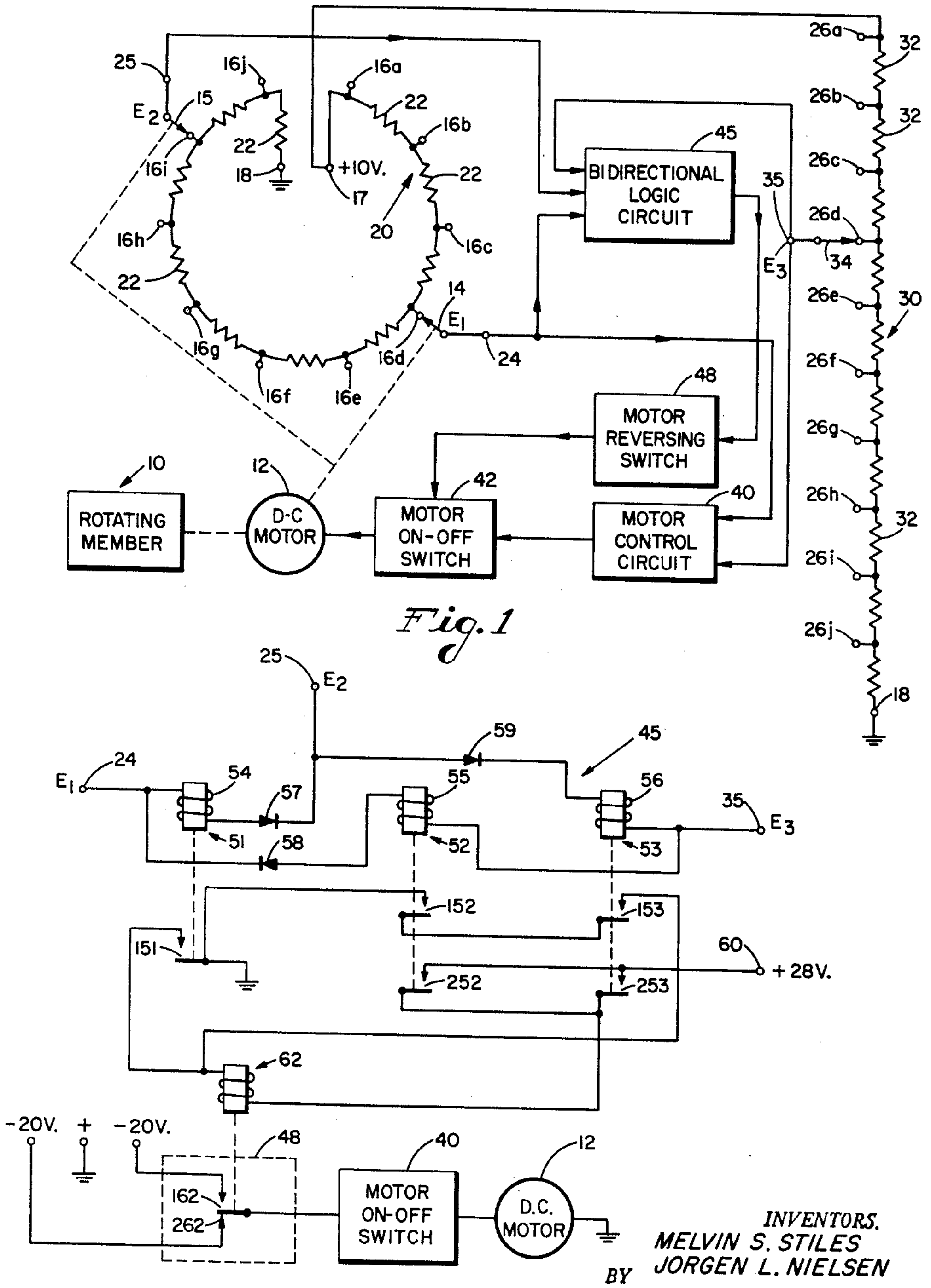
FIG. 1 is a diagram showing essential features of the invention.
FIG. 2 is a diagram showing details of the bi-directional logic circuit of FIG. 1.

Referring to FIG. 1 of the drawings, the basic control system is shown for a rotating member which is indicated by the reference numeral 10. Rotating member 10 is driven by motor 12 which, for example, may be a permanent magnet direct current motor characterized by relatively high starting torque and adaptability for both bi-directional operation and dynamic braking. Motor 12 of FIG. 1 also is mechanically coupled to a pair of rotary contactors 14 and 15; these contactors make contact with selected taps 16 along a string 20 of resistors 22. Each of the taps 16 forms the junction of two adjacent resistors 22.

Figure 3:
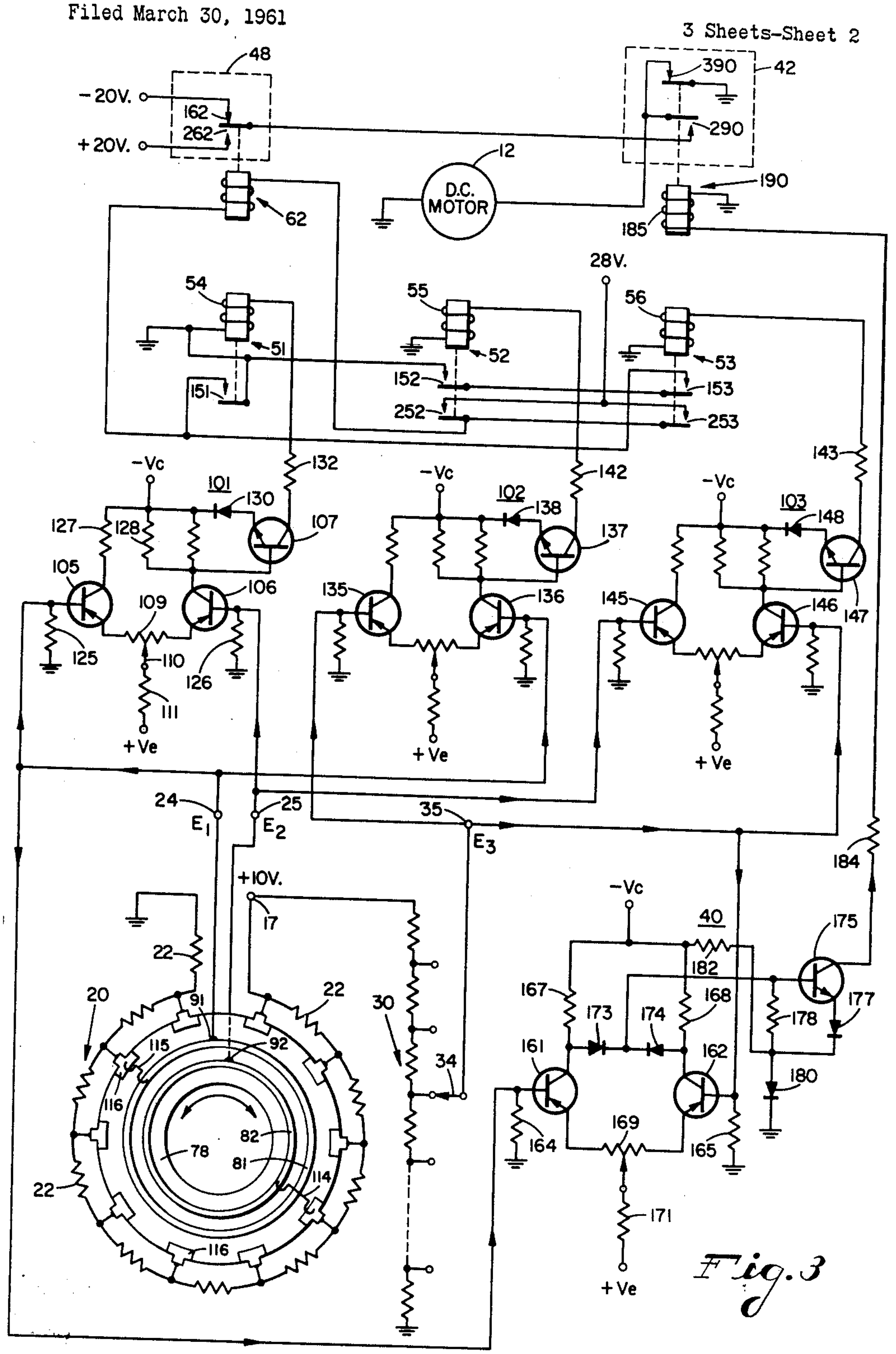
FIG. 3 is a circuit diagram of an embodiment of the invention which includes a bi-directional logic circuit differing from that shown in FIG. 2.

Before describing the manner in which bi-directional control of the rotating member is achieved in accordance with the invention, a somewhat detailed discussion of the resistor strings 20 and 30 is appropriate. For purposes of explanation, a ten-position rotary member will be assumed wherein each position is encoded with a unique voltage derived from resistor string 20. One end of this resistor string is connected to a positive terminal 17 of a direct current voltage source; the other end of the string is connected to the negative terminal 18 of the voltage source which, in this case, is at ground potential. In the system of FIG. 3, the potential at terminal 17 is indicated as 10 volts; assuming that all resistors 22 are of equal value, the potentials, in volts, relative to ground at the taps 16a, 16b, 16c, 16d, 16e, 16f, 16g, 16h, 16i and 16j are, respectively, 10 volts, 9 volts, 8 volts, 7 volts, 6 volts, 5 volts, 4 volts, 3 volts, 2 volts, and 1 volt. The potential at terminal 17 need not be 10 volts; the only requirement is that the same voltage be supplied to the positive end of resistor string or voltage divider 20 as is applied to the positive end of a second resistor string 30. The resistor string 30 comprises a series of ten resistors 32 of identical size; furthermore, each of resistors 32 is of the same size as the resistors 22 of resistor string 20. Several taps 26 are provided at the junction points of adjacent resistors 32. A movable contactor 34 can be set to engage any one of the taps 26a to 26j. Although the resistor string 30 is indicated in FIG. 1, and again in FIG. 3, as constituting a linear array of resistors, the arrangement may take any form. In practice, a circular array may be adopted wherein the contactor 34 is attached to a knob, the pointer of which moves across a circular scale. The scale may have calibration marks angularly disposed to correspond to the various angular positions of the rotating member.

The resistors 22 of resistor string 20, except for the resistor which is connected to ground terminal 18, are arranged along a circular path. One resistor must lie at least partially outside of the circular path owing to the obvious necessity for providing a physical discontinuity in the resistor string. The contactors 14 and 15 are mounted in such a manner as to be at all times displaced from one another by 180°. This requires that an even number of resistors be used in resistor strings 20 and 30.

It should be noted that tap 16j of resistor string 20 may be connected directly to ground terminal 18 and a resistor 22 connected between tap 16a and terminal 17. In this case, the voltages available at taps 16a . . . 16j would be 9 volts . . . 0 volts, all respectively. The contactor 34 associated with resistor string 30 then would engage contact 26b when at one limit of its travel and would engage a tap, not shown, connected to ground terminal 18′ of resistor string 30 when at the other limit. Tap 26a would not be used with such an arrangement.

It should be understood that there need not be a 1 to 1 correspondence between the voltage at terminal 17 and the number of positions of the rotating member. For example, the rotating member may have twenty positions, while the voltage at terminal 17 may be 15 volts. In this case, the voltage increment between adjacent taps would be 0.75 volt.

The potentials at terminals 17 and 18 may be reversed from those shown in FIGS. 1 and 3; the effects of such reversal will become more apparent as the description progresses.

Before continuing the explanation of the operation of the basic system of FIG. 1, it should be pointed out that the motor 12 may drive the circularly arranged resistor string 20 while the contactors 14 and 15 remain stationary, instead of driving the contactors 14 and 15 along a stationary resistor string 20, as indicated in FIGS. 1 and 3. In either case, there is relative movement between the oppositely disposed contactors 14 and 15, on the one hand, and resistor string 20, on the other. Moreover, the contactors 14 and 15 remain 180° apart in either case. Again, the effect of this alternative arrangement shown in FIGS. 1 and 3 will be shown subsequently.

The voltages derived at the terminals 24 and 25, connected to respective contactors 14 and 15 of resistor string 20, will be referred to, respectively, as $E_1$ and $E_2$, similarly, the voltage at terminal 35, to which contactor 34 of resistor string 30 is connected, will be referred to as $E_3$. With the contactors 14 and 15 set as shown in FIG. 1, $E_1$, $E_2$ and $E_3$ are 7 volts, 2 volts, and 7 volts, all respectively. The voltages $E_1$ and $E_2$ are always 5 volts apart in the example shown, wherein a ten-position rotating member 10 and equal one volt increments along the voltage dividers 20 and 30 are assumed. The voltages $E_1$ and $E_3$ are applied to motor control circuit 40; the latter functions to operate the motor on-off switch 42 and energize motor 12 whenever these two voltages are unequal. The switch 42 also causes the motor to remain energized until the movable portion of the resistor string assembly, that is, either contactors 14 and 15, or the resistor string itself (as the case may be) reaches a position at which voltages $E_1$ and $E_3$ become equal. A typical motor control circuit 40 is shown in FIG. 3 and will be described in detail subsequently in connection with the bi-directional logic circuit of FIG. 3. Since $E_1$ and $E_3$, as shown in FIG. 1, are each 7 volts, the motor is stationary and rotating member 10 is fixed at an angular position determined by the setting of contactor 34 along resistor string 30. If the resistor string 30 is arranged along the locus of a circle, the angular position of contactor 34 may be made to correspond with the angular position of contactor 14 of resistor string 20.

Now that the details of the resistor strings 20 and 30 have been described, the manner in which the control of the direction of rotation of motor 12 will be considered. A few examples will serve as a basis for a general summary of the requirements which the bi-directional logic circuit 45 of FIG. 1 must satisfy. As already explained, whenever voltages $E_1$ and $E_3$ are identical, the motor will remain stationary. If contactor 34 of resistor string 30 is moved, for example, from tap 26d to tap 26g, voltage $E_3$ will change to 4 volts. The motor 12 then will rotate until the voltage $E_1$ also reaches 4 volts. There are two directions through which the rotating member can be rotated to reach the position at which $E_1$ becomes 4 volts, that is, the position at which the contactor 14 engages contactor 16g of stationary resistor string 20. Note that successive taps are displaced $360 \div 10 = 36°$ apart. The rotating member 10, to which the contactors 14 and 15 are attached, can rotate clockwise through $3 \times 36 = 108°$ or counterclockwise through $7 \times 36 = 252°$. Obviously, the rotary movement of member 10 to the new position is achieved more quickly in a clockwise manner. In other words, a point on the periphery of the rotating member will traverse a shorter path when moving in a clockwise direction. The voltages $E_1$, $E_2$ and $E_3$ at the moment contactor 34 is moved to the new position engaging tap 26g and 7 volts, 2 volts and 4 volts, respectively. In other words, the relationship between the voltages is $$E_1 > E_3 > E_2$$

or $$E_1 > E_2;\ E_3 > E_2,\ \text{and}\ E_1 > E_3 \quad \text{(Condition 1)}$$

It can be shown that for all instances in which the aforesaid voltage relationship occurs, a clockwise rotation is prescribed; of course, when $E_1 = E_3$, but $E_1 > E_2$ and $E_3 > E_1$, there will be no rotation.

If the contactor 34 be moved from the position shown in FIG. 1 to engage tap 26j, and contactors 14 and 15 should engage tap 16i and 16d, respectively, the voltages $E_1$, $E_2$ and $E_3$ evidently would be 2 volts, 7 volts and 1 volt, respectively. Now motor 12 must turn until contactor 14 engages tap 16j, corresponding to one volt. Obviously, a clockwise movement through 36° is preferable to a counterclockwise movement through 324°. It may be shown that clockwise rotation is desired for any similar condition given by the relationship $$E_1 < E_2;\ E_1 < E_3\ \text{and}\ E_3 < E_2 \quad \text{(Condition 2)}$$

If contactor 34 is moved to engage tap 26b while contactors 14 and 15 still engage respective taps 16i and 16d, the voltages $E_1$, $E_2$ and $E_3$ becomes 2 volts, 7 volts and 9 volts, respectively. The motor now rotates until contactor 14 reaches the 9 volt position, that is, tap 16b. In rotating from tap 16i to 16b, a clockwise rotation of contactor 14 through 108° is preferable to a counterclockwise rotation through 252°. It can be shown that for any other condition given by the relationship $$E_1 < E_2;\ E_1 < E_3\ \text{and}\ E_3 < E_2 \quad \text{(Condition 3)}$$

clockwise rotation is desired. One exception occurs when $$E_1<E_2 \text{ and } E_1<E_3;\ E_3=E_2 \quad \text{(Condition 3A)}$$

In this situation, rotation through 180° is called for and the direction of rotation is immaterial.

If contactor 34 be moved to engage tap 26*e* while contactors 14 and 15 remain at respective taps 16*i* and 16*d*, the voltages $E_1$, $E_2$ and $E_3$ become 2 volts, 7 volts and 6 volts, respectively. Motor 12 will now rotate until contactor 14 engages tap 16*e*, corresponding to 6 volts. In rotating from tap 16*i* to 16*e*, a counterclockwise rotation of arm 14 through 144° is preferable to a clockwise rotation of 216°. This is but one example of the following voltage relationships wherein counterclockwise rotation is preferred $$E_1<E_3<E_2$$

or $$E_1<E_2;\ E_1<E_3;\ E_3<E_2 \quad \text{(Condition 4)}$$

In the event, however, that $E_1=E_3$ while $E_1<E_2$ and $E_3<E_2$, no rotation will occur.

If contactors 14 and 15 are in the position in FIG. 1 of the drawing while contactor 34 is set to engage tap 26*c*, the voltages $E_1$, $E_2$ and $E_3$ become 7 volts, 2 volts and 8 volts, respectively. The contactor 14 then must move from tap 16*d* to the position corresponding to 6 volts, viz, tap 16*c*. Obviously a counterclockwise rotation of 36° is more rapid than a clockwise rotation of 224°. Whenever the following voltage relationships occur, counterclockwise rotation is preferable $$E_1>E_2;\ E_1<E_3;\ E_3<E_2 \quad \text{(Condition 5)}$$

If contactors 14 and 15 are in the position shown in FIG. 1 while contactor 34 engages tap 26*i*, the voltages $E_1$, $E_2$ and $E_3$ are 7 volts, 2 volts and 1 volt, respectively. This relationship of voltages is $$E_1>E_2;\ E_1>E_3;\ E_3<E_2 \quad \text{(Condition 6)}$$

The contactor 14 must move from taps 16*d* to 16*j* before coming to rest. The faster rotation will be a counterclockwise rotation of 144°. For the last mentioned voltage relationship, counterclockwise rotation always is desirable. The exception is when $$E_1>E_2;\ E_1>E_3;\ E_3=E_2 \quad \text{(Condition 6A)}$$

During this condition, 180° rotation in either direction is equally suitable.

The purpose of the bi-directional logic circuit 45 is to insure that the desired direction of rotation of motor 12 will occur for each of the voltage relationships. This bi-directional logic circuit 45, about to be explained in detail, is supplied with voltages $E_1$, $E_2$ and $E_3$ and produces an output which operates upon motor reversing switch 48.

As already mentioned, motor 12 may be adapted to rotate resistor string 20 of FIG. 1, while contactors 14 and 15 remain stationary. Assume that contactors 14 are fixed at the position shown in FIG. 1 and that contactor 34 is at tap 26*j*, corresponding to 4 volts. The voltages $E_1$, $E_2$ and $E_3$ are identical to those existing in the first example, that is, 7 volts, 2 volts and 4 volts, respectively. If the resistor string 20 rotates, the motor 12 will be driven until it carries tap 16*g*, corresponding to 4 volts, into engagement with contactor 14. This may be achieved by a counterclockwise rotations of 108° or by clockwise rotation of 252°. The magnitudes of the angles of rotation of the two directions are identical to those in the first example given. Now, however, the smaller rotation is counterclockwise rather than clockwise. It should now be evident that, with the resistor string 20 rotating and the contactors 14 and 15 stationary, the desired direction of rotation will be just the reverse of that described wherein the contactors 14 and 15 are driven by the motor along the fixed resistor string 20. This reversal does not affect the design of the bi-directional logic circuit 45, but merely requires that the contacts of the motor reversing switch 48 connected thereto be oppositely connected to the motor supply terminals. This change will become much clearer as the description advances.

The voltage conditions and the desired direction of rotation may be summarized in Table I below.

*Table I*

| Voltage Condition | Desired Direction of Rotation of Motor When Contactors 14 and 15 Rotate Relative to Fixed Resistor String 20 | Desired Direction of Rotation of Motor When Resistor String 20 Rotates Relative to Fixed Contactors 14 and 15 |
|---|---|---|
| 1. $E_1>E_2$; $E_1>E_3$; $E_3>E_2$ | Clockwise | Counterclockwise. |
| 2. $E_1<E_2$; $E_1>E_3$; $E_3<E_2$ | do | Do. |
| 3. $E_1<E_2$; $E_1<E_3$; $E_3>E_2$ | do | Do. |
| 3A. $E_1<E_2$; $E_1<E_3$; $E_3=E_2$ | Either Direction [1] | Either Direction.[2] |
| 4. $E_1<E_2$; $E_1<E_3$; $E_3<E_2$ | Counter clockwise. | Clockwise. |
| 5. $E_1>E_2$; $E_1<E_3$; $E_3>E_2$ | do | Do. |
| 6. $E_1>E_2$; $E_1>E_3$; $E_3<E_2$ | do | Do. |
| 6A. $E_1>E_2$; $E_1>E_3$; $E_3=E_2$ | Either Direction.[1] | Either Direction.[2] |

[1] With the logic circuit 45 of Fig. 3, the direction is counterclockwise.
[2] With the logic circuit 45 of Fig. 3, the direction is clockwise.

One embodiment of the bi-directional logic circuit 45 of FIG. 1 is illustrated in FIG. 2 and includes three relays 51, 52 and 53 having respective windings 54, 55 and 56. Relay windings 54–56 are connected in series with respective diodes 57, 58 and 59. The winding 54 of relay 51 is connected between terminals 24 and 25 and, by virtue of the connection of diode 57, will be energized only when $E_1>E_2$, where both voltages are positive. Similarly, winding 55 of relay 52 is connected between terminals 24 and 35 and, because of the polarity of diode 58, is energized only when $E_3>E_1$. The winding 56 of relay 53 interconnecting terminals 25 and 35 will pass current through diode 59 only when $E_2>E_3$. The operation of relays 51, 52 and 53 in terms of the voltage conditions previously tabulated in Table I can now be summarized by Table II.

*Table II*

| Voltage Condition | Relays Energized | Ungrounded Terminal to Which Motor 12 is Connected, v. |
|---|---|---|
| 1 | 51 | −20 |
| 2 | 53 | −20 |
| 3 | 52 | −20 |
| 3A | 52 | −20 |
| 4 | 52, 53 | +20 |
| 5 | 51, 52 | +20 |
| 6 | 51, 53 | +20 |
| 6A | 51 | −20 |

During voltage condition 1, that is, when only one of the relays 51–53 is energized, the contacts 151 of energized relay 51 close; however, contacts 252, 153 and 253 are open. Consequently, the path from the positive terminal 60 of the 28-volt energizing source to the negative or ground terminal is broken and relay 62 is deenergized. Contacts 162 and 262 of relay 62 serve as a motor reversing switch 48. When relay 62 is deenergized, relay contacts 262 are closed and motor 12 is connected between the −20 volt terminal and ground. This condition is indicated in Table II. During voltage condition 2, that is, when relay 53 only is energized, contacts 153 and 253 are closed, but contacts 151, 152 and 252 are open. Hence, the path from positive terminal 60 to ground is broken and relay 62 is deenergized. Likewise, during voltage condition 3 (or 3A) when relay 52 only is energized, contacts 151 again are open and relay 62 remains deenergized. It is now apparent that, when but one of the relays is energized, as is the case during voltage conditions 1, 2 and 3, or 3A, the ungrounded terminals of motor 12 are connected to the −20 volt terminal through motor on-off switch 42 and contacts 162 of deenergized relay 62. The magnetic field of motor 12 may be disposed so that the motor rotates in a clockwise direction during all of these voltage conditions.

If, however, voltage conditions 4, 5 and 6 exist, whereupon any two of the three relays are energized, a circuit between terminal 60 and ground is completed through closed contacts of the two energized relays and relay 62 is energized. Contacts 262 of relay 62 now close and the ungrounded side of motor 12 is connected by way of on-off switch 40 to the +20 volt terminal. During the existence of voltage conditions 4, 5 and 6, therefore, the direction of motor rotation will be counterclockwise, that is, opposite to that during the existence of voltage conditions 1, 2 and 3. During voltage conditions 3A and 6A, 180° rotation is called for; in these instances, the direction of motor rotation is immaterial. The logic circuit 45 is such that the direction of motor rotation for voltage conditions 3A and 6A is the same as that for voltage conditions 1, 2 and 3. A comparison of Tables I and II now indicate that the bi-directional requirements have been satisfied. For the case of fixed resistor string 20 and movable contactors 14 and 15, clockwise rotation is called for in voltage conditions 1, 2 and 3, while counterclockwise rotation is indicated for voltage conditions 4, 5 and 6. In the former case, the motor can be made to rotate clockwise and in the reverse direction for voltage conditions 4 to 6. The actual direction of rotation for a given position of the switch 48 will depend, of course, upon the direction of the magnetic field which the motor armature is cutting.

Before proceeding with a detailed description of the bi-directional logic circuit of FIGS. 3 and 4, reference will now be made to FIGS. 5 to 8 which disclose details of construction of the rotation control system according to the invention. In FIGS. 5 and 6, the string 20 of resistors 22 is stationary and the contactors 14 and 15 rotate with the movable member 65. The latter is attached, as by a bracket 66 and screws 67, to a ring gear 68; the ring gear 68 meshes with a driving gear 70 which may be mounted on the shaft 71 of the motor 12, not shown. The ring gear 68 is rotatably mounted on bearing 72 held in place between gear 68 and a ring 73 attached to base plate 74. A bifurcated contactor 115, corresponding to contactor 15 of FIG. 1, is mounted to an electrically insulating strip 76 and the latter, in turn, attached to gear 68 by means of one or more fastening devices 77 of electrically insulating material. An annulus 78 of electrically insulating material is attached by appropriate means to base 74. Upon this annulus are disposed two concentric conductive rings 81 and 82 and several spaced contacts 116 arranged along the locus of a circle concentric with rings 81 and 82. Contacts 116 correspond to the taps 16 of FIG. 1. A resistor 22 is connected between adjacent contacts 116. Contactor 115 includes a pair of resilient fingers 84 and 85; finger 84 makes wiping contact with contacts 116, while finger 85 resiliently engages ring 81. A contactor 114 corresponding to contactor 14 of FIG. 1 is mounted to gear 68 at a point diametrically opposite contactor 115; see FIG. 6. One finger 87 of contactor 114 resiliently engages ring 82 and the other finger 88 is adapted to make wiping contact with contacts 116. Taps 91 and 92 are taken from some point along respective rings 81 and 82 and are connected to the respective terminals 24 and 25 at which voltages $E_1$ and $E_2$ appear.

Figures 4, 5, 6, 7, 8:
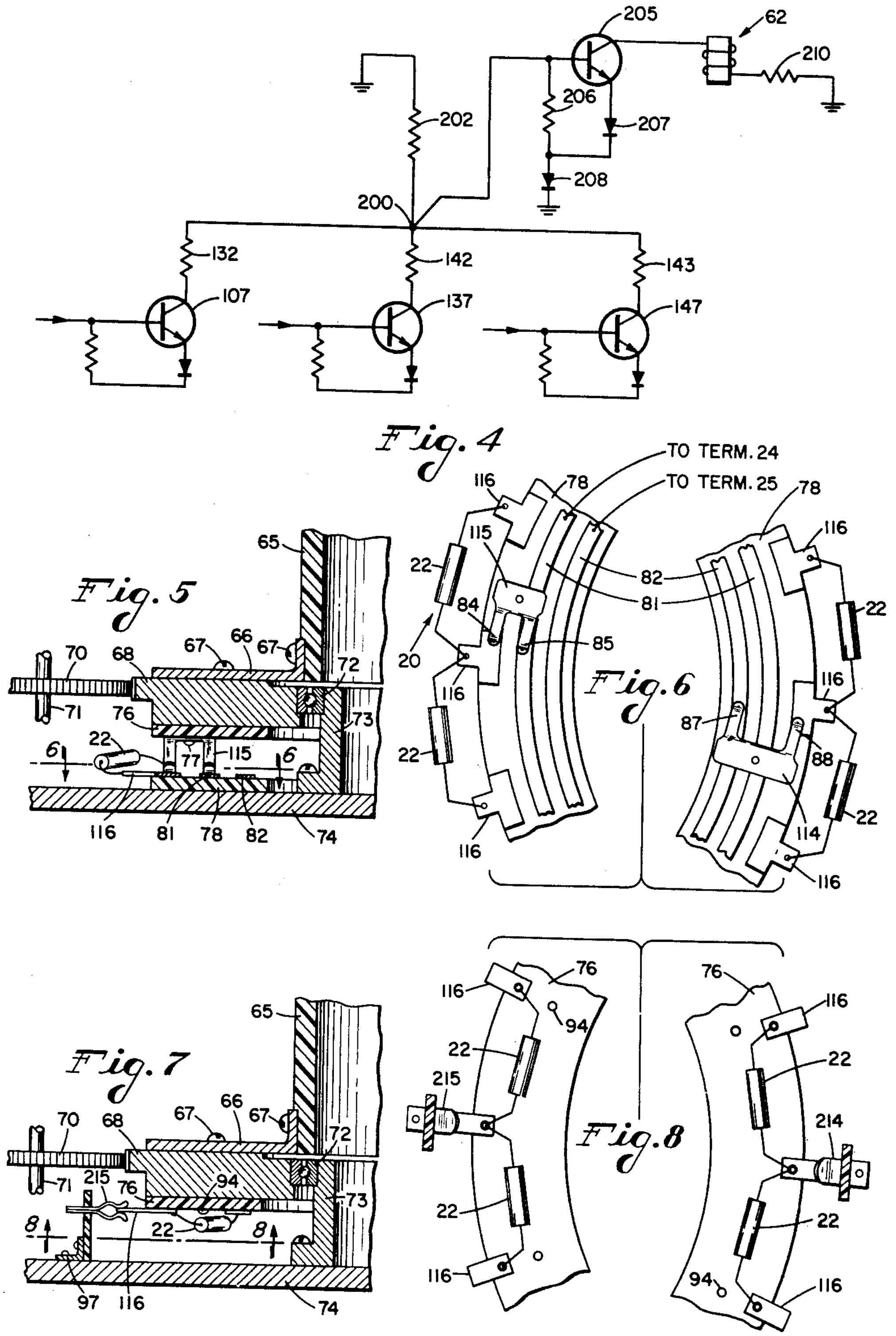
FIG. 4 is a circuit diagram sufficient to disclose a modification of the bi-directional logic circuit of FIG. 3.
FIG. 5 is a detailed view in cross-section showing a portion of a rotating member and its relationship with a stationary resistor string, such as indicated schematically in FIG. 1.
FIG. 6 is a section view of portions of the resistor string assembly of FIG. 5 taken along line 6—6.
FIG. 7 is a detailed view in cross-section showing a portion of a rotating member and its relationship with a resistor string assembly adapted to rotate with the rotating member.
FIG. 8 is a section view of a portion of a resistor string assembly of FIG. 7 taken along line 8—8.

Referring to FIGS. 7 and 8, wherein elements corresponding to those of FIGS. 5 and 6 are indicated by the same reference numerals, the string 20 of resistors 22 is rotated with rotating member 65, while the contactor means 214 and 215, corresponding to respective contactors 114 and 115 of FIGS. 5 and 6, are stationary. The electrically insulating annulus 78 of FIGS. 7 and 8, which may be attached to ring gear 68 by one or more rivets 94, differs from the annulus of FIGS. 5 and 6 in that it does not contain the continuous concentric rings 81 and 82 or the taps 91 and 92. The space taps 116 of FIGS. 7 and 8 are fixed to the periphery of annulus 78 and are adapted to rotate into contact with a pair of fixed contactors 214 and 215 disposed diametrically opposite one another. Only contactor 215 is visible in FIG. 7. The contactors 214 and 215 may be mounted in an electrically insulated member 96 supported from base 74 by bracket 97.

It should be noted that the motor 12 is of such design that it drives the contactors 114 and 115 from one contact segment 116 to the next sufficiently fast to prevent drop-out or pull-in of the motor reversing relay 62 during movement of the rotating member to a desired new position. A latching relay may be used to obviate the requirement of the above relationship between motor speed and relay operating time. The logic circuit also can be prevented from operating improperly during the interval in which the contactors 114 and 115 may not engage contact 116 by having the contact 84 of FIG. 6, for example, of the make-before-break type. In any event, the motor control circuit itself will continue to operate using a contact such as shown in FIGS. 5 and 6, since the voltages would be compared even though the contactor is between contact segments.

The contact segments 116 may have two portions of different lengths. The portion of shorter length may be engaged by the set of contactors 114 and 115, while the portion of longer length may be engaged by a separate set of contactors mounted adjacent the corresponding contactors 114 and 115. An additional pair of rings, similar to rings 81 and 82, would be provided for picking off the voltages $E_1$ and $E_2$ determined by the position of this additional set of contactors. The voltages $E_1$ and $E_2$ taken from rings 81 and 82 would be applied to the motor control circuit 40, while voltages $E_1$ and $E_2$ taken from the additional rings would be applied to the bi-directional logic circuit 45.

It will be noted that the two resistor strings 20 and 30, together with the bi-directional logic circuit 45, form, in effect, a bridge circuit. The relays 51 to 53 used in the bi-directional logic circuit 45 of FIG. 2 must operate at some voltage which represents the difference between adjacent positions of the rotating member. In the example previously mentioned, this voltage is one volt; however, in many applications involving a greater number of rotating member positions, this voltage may be a fraction of a volt. The same relays, however, must also operate with a maximum voltage across the coil several times as large; for example, in the application cited, a maximum voltage might be ten volts. This represents a 10:1 voltage range, in the example cited, or a 100:1 power differential. Relays capable of handling this power range and sufficiently sensitive to operate at the lower voltage limit are difficult to obtain. Furthermore, the impedances presented by the relays 51 to 53 in the bridge circuit may produce loading sufficient to change the voltage 1 of the resistor strings to such an extent that a voltage match between voltages $E_1$ and $E_3$ cannot be obtained and motor 12 will hunt. For this reason, it is often necessary to provide better isolation between the input voltages $E_1$, $E_2$ and $E_3$ and to drive the relay at a constant voltage independent of the input voltages. A transistorized bi-directional logic circuit providing the necessary isolation is shown in FIG. 3, together with a motor control circuit 40. Elements corresponding to those of FIG. 2 are indicated in FIG. 3 by the same reference numerals.

The bi-directional logic circuit of FIG. 3 includes, in addition to the three relays 51 to 53 of FIG. 2, three transistor circuits 101, 102 and 103. Since these three transistor circuits are identical in construction and operation, circuit 101 only will be described in detail. Two transistors 105 and 106 are connected in circuit 101 as an emitter-coupled balanced differential amplifier, such as shown in FIG. 2–0.6 on pages 2–8 of "A Handbook of Selected Semiconductor Circuits," prepared for the Bureau of Ships, Department of the Navy, under Contract NObsr 75231. The emitter are coupled through a potentiometer 109, the slider 110 of which is connected through a common emitter resistor 111 to a positive biasing source $+V_e$. The resistance of resistor 111 is relatively large and the total current in the two transistors 105 and 106 is substantially independent of the value of the voltages to be compared. Biasing resistors 125 and 126 are connected between the bases of receptive transistors 105 and 106 and ground. The collectors of transistors 105 and 106 are connected to negative biasing voltage $-V_c$ through respective resistors 127 and 128. The potentiometer slider 110 may be set so that a collector voltage at each transistor is identical when equal voltages are separately supplied to the bases of transistors 105 and 106.

The positive voltages $E_1$ and $E_2$ at terminals 24 and 25 are applied to the bases of transistors 105 and 106, respectively. If $E_1$ is larger (more positive) than $E_2$, transistor 106 will eventually be conductive while transistor 105 will be cut off. Hence, the voltage at the collector 106 will decrease, that is, will become more positive than $-V_c$. This decreasingly negative voltage at the collector of transistor 106 is impressed upon the base of 107. Since the cathode of diode 130 in the emitter circuit of transistor 107 is at the negative voltage of $-V_c$, diode 130 conducts and current flows through current-limiting resistor 132 and the winding 54 of relay 51 in the collector circuit of transistor 107. Diode 130, in addition to acting as a bias stabilizing diode for transistor 107, aids in obtaining positive switching action in transistor 107.

When the voltage $E_2$ is larger than $E_1$, transistor 105 becomes the conductive device and transistor 106 is cut off. A voltage drop no longer occurs across collector resistor 128, the voltage at the base of transistor 107 becomes substantially equal to $-V_c$, and diode 130 can no longer conduct. Consequently, transistor 107 does not conduct and relay 51 is deenergized.

Similarly, the transistors 135 and 136 of transistor 102 receive respective voltages of $E_3$ and $E_1$ and cause diode 138 and transistor 137 to pass current through resistor 142 and the winding 55 of relay 52 whenever voltage $E_3$ is greater than $E_1$. When $E_3$ is less than $E_1$, diode 138 and transistor 137 are cut off, whereupon relay 52 is deenergized. In like manner, the transistors 145 and 146 of transistor circuit 103 are supplied with voltages $E_2$ and $E_3$, respectively. Whenever $E_2$ is greater than $E_3$, diode 148 and transistor 147 passes current through transistor 143 and winding 56 of relay 53. When $E_2$ is less than $E_3$, however, relay 53 is deenergized. The relays 51 to 53 operate in the same manner as explained in connection with FIG. 2 to energize or deenergize relay 62, depending upon the particular voltage condition in existence. See Table II.

The motor control circuit 40 of FIG. 3 includes a pair of transistors 161 and 162 having respective bias resistors 164 and 165 and also including respective collector resistors 167 and 168 connected to a common negative collector biasing potential $-V_c$. A common emitter circuit includes a balancing potentiometer 169 and a resistor 171 connected to a positive emitter having a potential $+V_e$. An output lead interconnects the junction point of two diodes 173 and 174 and the base of emitter-follower transistor 175. Transistor 175 has a diode 177 and biasing resistor 178 in the emitter circuit, as well as a Zener diode 180. A resistor 182 couples the negative potential in $-V_c$ to the anode of Zener diode 180. The collector output circuit of transistor 175 includes a current-limiting resistor 184 and a winding 185 of relay 190. Relay 190 has contacts 290 and 390 which constitute the on-off switch 42 for motor 12.

Circuit 40 includes a differential amplifier which performs in somewhat similar manner to the three transistor circuits 101 to 103 already described in the bi-directional logic circuit. Transistors 161 and 162 are supplied with voltages $E_1$ and $E_3$, respectively. The circuit 40 differs from circuits 101 to 103, however, in that operation of relay 190 in the collector circuit of transistor 175 is desired whenever $E_1$ and $E_3$ differ, but not when voltages $E_1$ and $E_3$ are equal. If voltages $E_1$ and $E_3$ are unequal, the collector of either transistor 161 or 162 will drop to some voltage more positive than $-V_c$. For example, if $E_1$ is greater than $E_3$, transistor 162 conducts more heavily than transistor 161 and the voltage at the collector of 162 will become more positive (less negative). This allows diode 174 to conduct and the base of transistor 175 becomes more positive, by a few volts. On the other hand, if $E_1$ is less than $E_3$, transistor 161 will conduct more heavily, the collector of 162 becomes more positive, diode 173 conducts and the base of transistor 175 still becomes more positive, that is, by the aforementioned few volts. This relatively positive voltage on the base of transistor 175 is sufficient to establish current flow through diode 177, transistor 175, current-limiting resistor 184 and winding 185 of relay 190. Contacts 290 close and a continuous path is presented between either of the 20-volt terminals through the motor reversing switch 48 and motor 12 to ground. Motor 12 then rotates in a direction dependent upon which one of the contacts 162 or 262 of relay 62 are closed.

If the voltages $E_1$ and $E_3$ are equal, however, the current will divide equally between transistors 161 and 162 (assuming that potentiometer 169 is properly set for initial balance) and the voltage at both collectors will be less positive than the voltage coupled from one collector to the base of transistor 175 when $E_1$ is not equal to $E_3$. The voltage now applied to the base of transistor 175 is insufficient to overcome the negative bias on the cathode of diode 177 established by Zener diode 180. Hence, the driver 175 for relay 190 does not conduct. Since relay 190 is not energized, contacts 290 are open and the path from one of the 20-volt terminals through the motor 12 and ground is broken. This causes motor 12 to stop.

Because of inertia, the motor tends to overshoot; this tendency may be minimized by dynamic braking wherein contacts 390 of relay 190 close during deenergization of relay 190, thereby shorting the armature of motor 12.

The Zener diode 180 in circuit 40 must be biased so that its voltage is more negative than the voltage developed at the base of transistor 175 when $E_1$ is not equal to $E_3$, but is more positive than the voltage supplied to the base of transistor 175 when $E_1$ equals $E_3$ (i.e., substantially midway between the collector swing of transistor 161 or 162). If the Zener diode were omitted, diode 177 would always conduct and relay 190 would always be energized inasmuch as the collector voltage supplied to the transistor 175 would always be more positive than the voltage $-V_c$.

A modification of the bi-directional logic circuit of FIG. 3 is shown in FIG. 4 where the relay 62 of FIG. 3 is common to all of the output transistors 107, 137 and 147. This is in contrast to the bi-directional logic circuit of FIG. 3 wherein the collector circuit of each of the output transistors includes separate relays 51, 52 and 53, respectively. The collector resistors 132, 142 and 143 are connected to a common junction point 200 which, in turn, is connected to ground through a resistor 202 and also to the base of transistor 205. A diode 207 and biasing resistor 206 are provided in the emitter circuit of transistor 205, together with a Zener diode 208. A resistor 210 and relay 62 are included in the collector circuit of this transistor. As already mentioned in connection with FIG. 3, collector current flows in transistor 107 whenever $E_1$ is greater than $E_2$. Similarly, collector current flows in transistor 137 when $E_3$ is greater than $E_1$ and in transistor 147 when $E_2$ is greater than $E_3$. When $E_1$ is less than $E_2$ no collector current flows in transistor 107. Likewise, no collector current flows in transistors 137 and 147 when $E_3$ is less than $E_1$, or $E_2$ is less than $E_3$. Referring to the previous voltage conditions shown in Tables I and II, it is now possible to construct a third table showing which of the transistors have collector current flow for a given voltage condition.

*Table III*

| Voltage condition: | Transistors with collector current flow |
|---|---|
| 1 | 107 |
| 2 | 147 |
| 3 | 137 |
| 3A | 137 |
| 4 | 137, 147 |
| 5 | 107, 137 |
| 6 | 107, 147 |
| 6A | 107 |

A glance at Table III will indicate that there are two distance conduction states, namely, (1) collector current flows in one only of the three output transistors, and (2) collector current flows in two of the three output transistors. The circuit of FIG. 4 responds to the two conduction states in such a manner that relay 62 is energized during one conduction state but deenergized during the other. If collector current flows through one only of the output transistors, the voltage at point 200, that is, the voltage at the base of transistor 205, is negative with respect to ground; however, it is less negative than the voltage on the cathode of diode 207 as established by the Zener diode 208. The transistor 205 conducts and current flowing through resistor 210 and relay 62 closes contacts 162 to connect motor 12 between the +20 volt terminal and ground. When collector current flows through two of the output transistors, however, the current flowing through resistor 202 increases almost two-fold. The increased voltage drop in resistor 202 causes point 200, and, hence, the base of transistor 205, to go more negative. The increased negative voltage is now great enough to overcome the fixed negative voltage at the cathode of diode 207 set up by Zener diode 208, so that transistor 205 cuts off. Relay 62 now is deenergized, contacts 262 close, and motor 12 is connected between the —20 volt terminal and ground. Motor 12 thus rotates in a direction opposite to that when one only of the output transistors conducts. During conditions 3A and 6A—wherein voltages $E_2$ and $E_3$ are equal—only one of the output transistors, namely, transistors 137 or 107, is conducting. Consequently, the direction of rotation of motor 12 will be the same during conditions 3A and 6A as for conditions 1 to 3. This direction of rotation for conditions 3A and 6A is satisfactory, since it is immaterial in what direction the 180° rotation is accomplished.

What is claimed is:

1. A position selection system for a rotatable member driven by a motor comprising means for deriving a refference voltage capable of being varied in discrete steps in accordance with a desired position of said rotatable member, means coupled to said rotatable member for selecting first and second control voltages the magnitudes of which are dependent upon the position occupied by said rotatable member, and direction control means for said motor responsive to each of said reference voltages and said first and second voltages for rotating said member to said desired position through the lesser of two possible angular displacements.

2. A position selection system for a rotatable member driven by a motor comprising means for deriving a reference voltage capable of being varied in discrete steps in accordance with a desired preselected position of said rotatable member, means coupled to said rotatable member for selecting first and second control voltages the magnitudes of which are dependent upon the position occupied by said rotatable member, on-off control means for said motor responsive to said reference voltage and to one of said control voltages for energizing said motor whenever said reference voltage and said one control voltage are unequal, and direction control means for said motor responsive to each of said reference voltage and said first and second control voltages for rotating said member to a desired position through the lesser of two possible angular displacements.

3. A position selection system for a rotating member driven by a motor comprising means for deriving a reference voltage capable of being varied in discrete uniform steps in accordance with a desired position of said member, means for selecting first and second control voltages the magnitude of which are dependent upon the position occupied by said member, control means for said motor responsive to said reference voltage and to one of said control voltages for energizing said motor whenever said reference voltage and said one control voltage are unequal, said motor control means including a solid state differential amplifier to which said reference voltage and said one control voltage are applied, an electron device having an input circuit coupled to said differential amplifier, and a voltage reference device in the input circuit of said electron device for biasing said electron device to cutoff only when said applied voltages are of equal magnitude.

4. A system for selecting one of $n$ positions for a rotatable member driven by a motor, where $n$ is an even integer, comprising a first voltage divider of circular configuration having two contactors disposed diametrically opposite one another, each of said contactors occupying one of $n$ positions dependent upon the position of said member, first and second voltages being available at corresponding ones of said contactors of the first voltage divider the magnitudes of which are a function of the position occupied by said member, a second voltage divider capable of being varied in $n$ steps to derive a third voltage representative of a selected new position of said member, first control means for said motor responsive to said third voltage and to one of said first and second voltages for energizing said motor whenever said third voltage and said one voltage are unequal, direction control means for said motor energized by said first, second and third voltages and operating in one of two possible conditions depending upon the existing relationships between said three voltages, said direction control means effecting rotation of said motor in the direction of lesser angular displacement.

5. A position selection system for a rotatable member driven by a motor comprising a first voltage divider array having an even number of serially-connected impedance elements arranged in circular fashion, a plurality of taps each disposed at a junction of adjacent elements of said first array, each of said taps occupying discrete angular positions along said first array, a pair of contactors disposed always to engage taps of said first array which are diametrically opposite, said contactors and said first array of impedance elements being mounted to rotate with respect to one another when said drive motor is energized, first and second voltages being available at said oppositely disposed contactors the magnitudes of which depend upon the position of said rotatable member, a second array of serially-connected impedance elements, a plurality of taps each disposed at a junction of adjacent elements of said second array, each of said taps being at a potential equal to that of a corresponding tap of said first array, a contact element disposed to engage a selected tap of said second array for selecting a third control voltage in accordance with the position of said contact element which is representative of a desired new position for said rotatable member, a first control means for said motor responsive to one of said first and second voltages and to said third voltage for energizing said drive motor whenever said first and third voltages are unequal, and a second control means for said motor responsive to said first, second and third voltages for driving said rotatable member to a selected new position in the direction resulting in the lesser of two possible angular displacements.

6. A position selection system for a rotatable member driven by a motor comprising a first voltage divider array having an even number of serially-connected impedance elements arranged in circular fashion, a plurality of taps each disposed at a junction of adjacent elements of said first array, each of said taps occupying discrete angular positions along said first array, a pair of contactors disposed always to engage taps of said first array which are diametrically opposite, said contactors and said first array of impedance elements being mounted to rotate with respect to one another when said drive motor is energized, first and second voltages being available at said oppositely disposed contactors the magnitudes of which depend upon the position of said rotatable member, a second voltage divider array of serially-connected impedance elements, a contact element movable along said second array for selecting a third control voltage in accordance with the position of said contact element which is representative of a desired new position for said rotatable member, a first control means for said motor responsive to one of said first and second voltages and to said third voltage for energizing said drive motor whenever said first and third voltages are unequal, and a second control means for said motor responsive to said first, second and third voltages for driving said rotatable member to a selected new position in the direction resulting in the lesser of two possible angular displacements.

7. A position selection system for a rotatable member according to claim 6 wherein said first and second voltage divider arrays are electrically identical.

8. A position selection system for a rotatable member driven by a motor comprising a first voltage divider array of an even number of serially-connected impedance elements arranged in circular fashion, a plurality of taps each disposed at a junction of adjacent elements of said first array, each of said taps occupying discrete angular positions along said first array, a pair of movable contactors disposed always to engage taps of said first array which are diametrically opposite, said movable contactors being mounted to rotate with said rotatable member, first and second voltages being available at said oppositely disposed contactors the magnitude of which depend upon the position of said rotatable member, a second voltage divider array of serially-connected impedance elements, a contact element movable along said second array for selecting a third control voltage in accordance with the position of said contact element which is representative of a desired new position for said rotatable member, a first control means for said motor responsive to one of said first and second voltages and to said third voltage for energizing said drive motor whenever said first and third voltages are unequal, and a second control means for said motor responsive to said first, second and third voltages for driving said rotatable member to a selected new position in the direction resulting in the lesser of two possible angular displacements.

9. A position selection system for a rotatable member driven by a motor comprising a first voltage divider array of an even number of serially-connected impedance elements arranged in circular fashion, a plurality of taps each disposed at a junction of adjacent elements of said first array, each of said taps occupying discrete angular positions along said first array, a pair of fixed contactors disposed always to engage taps of said first array which are diametrically opposite, said first array of impedance elements being mounted to rotate with said rotatable member, first and second voltages being available at said oppositely disposed contactors the magnitudes of which depend upon the position of said rotatable member, a second voltage divider array of serially-connected impedance elements, a contact element movable along said second array for selecting a third control voltage in accordance with the position of said contact element which is representative of a desired new position for said rotatable member, a first control means for said motor responsive to one of said first and second voltages and to said third voltage for energizing said drive motor whenever said first and third voltages are unequal, and a second control means for said motor responsive to said first, second and third voltages for driving said rotatable member to a selected new position in the direction resulting in the lesser of two possible angular displacements.

10. A position selection system for a rotatable member comprising a first array of an even number of serially-connected resistive elements arranged in circular fashion, a plurality of taps each disposed at a junction of adjacent resistive elements, each of said taps occupying discrete angular positions along said first array, a pair of contactors disposed always to engage taps of said first array which are diametrically opposite, means for contacting different ones of said junctions depending upon first and second control voltages being available at said oppositely disposed contactors of magnitude depending upon the position of said rotatable member, a second array of serially-connected resistive elements electrically identical to said first array, a contact element movable along said second array for selecting a third control voltage in accordance with the position of said contact element, a drive motor attached to the arms of said first potentiometer mechanically connected to said rotatable member, said contactors and said first array of resistors being mounted to rotate with respect to one another when said drive motor is energized, a first control means for said motor responsive to one of said first and second voltages and to said third voltage for energizing said drive motor whenever said one voltage and said third voltage are unequal, a second control means for said motor including a first solid state voltage comparator supplied by said first and second control voltages, a second solid state voltage comparator supplied by said first and third voltages and a third solid state voltage comparator supplied by said second and third voltages, each of said comparators having a control relay in the output circuit thereof, a reversing switch for said motor connected in circuit with said control relay for driving said motor in a direction resulting in the lesser of two possible angular displacements.

11. A position selection system for a rotatable member comprising a first array of an even number of serially-connected resistive elements arranged in circular fashion, a plurality of taps each disposed at a junction of adjacent resistive elements, each of said taps occupying discrete angular positions along said first array, a pair of contactors disposed always to engage taps of said first array which are diametrically opposite, means for contacting different ones of said junctions depending upon first and second control voltages being available at said oppositely disposed contactors of magnitude depending upon the position of said rotatable member, a second array of serially-connected resistive elements electrically identical to said first array, a contact element movable along said second array for selecting a third control voltage in accordance with the position of said contact element, a drive motor attached to the arms of said first potentiometer mechanically connected to said rotatable member, said contactors and said first array of resistors being mounted to rotate with respect to one another when said drive motor is energized, a first control means for said motor responsive to one of said first and second voltages and to said third voltage for energizing said drive motor whenever said one voltage and said third voltage are unequal, a second control means for said motor including a first solid state voltage comparator supplied by said first and second control voltages, a second solid state voltage comparator supplied by said first and third voltages and a third solid state voltage comparator supplied by said second and third voltages, an electron device circuit common to each of said comparators, a control relay in the output circuit of said electron device, a reversing switch for said motor connected in circuit with said control relay for driving said motor in a direction resulting in the lesser of two possible angular displacements.

References Cited in the file of this patent

UNITED STATES PATENTS

| | | |
|---|---|---|
| 2,384,622 | Isserstedt | Sept. 11, 1945 |
| 2,538,415 | Ergen | Jan. 16, 1951 |
| 2,861,233 | McKeown | Nov. 18, 1958 |
| 2,872,595 | Pinckaers | Feb. 3, 1959 |
| 2,889,505 | Sigel | June 2, 1959 |
| 2,889,507 | Kennedy et al. | June 2, 1959 |
| 2,922,930 | Schaeve | Jan. 26, 1960 |
| 2,924,757 | Schaeve | Feb. 9, 1960 |
| 2,944,202 | Bonaccorsi et al. | July 5, 1960 |
| 3,010,059 | McLaughlin et al. | Nov. 21, 1961 |